United States Patent
Wada

[11] Patent Number: 6,126,907
[45] Date of Patent: Oct. 3, 2000

[54] THERMAL DECOMPOSITION APPARATUS OF REVERSED TEMPERATURE GRADIENT TYPE FOR POLYMER WASTE

[76] Inventor: Youichi Wada, 1437-5, Gondou-cho, Ohazatsuruga, Nagano-shi, Nagano, 380-0833, Japan

[21] Appl. No.: 09/100,090

[22] Filed: Jun. 19, 1998

[30] Foreign Application Priority Data

Jun. 17, 1998 [JP] Japan .................................. 10-170081

[51] Int. Cl.$^7$ ...................................................... B09B 3/00
[52] U.S. Cl. ........................ 422/184.1; 422/189; 202/117; 202/118; 202/120; 202/128; 110/246; 110/250
[58] Field of Search ................................ 422/184.1, 232, 422/233, 189, 193; 585/241; 202/117–119, 120, 128; 110/250, 241, 246, 257, 255, 229, 275, 346

[56] References Cited

U.S. PATENT DOCUMENTS

| | | | |
|---|---|---|---|
| 4,062,304 | 12/1977 | Herbold et al. | 110/255 |
| 4,084,521 | 4/1978 | Herbold et al. | 110/242 |
| 4,339,358 | 7/1982 | Schutz | 521/49.5 |
| 4,781,796 | 11/1988 | Bridle et al. | 202/117 |
| 4,983,278 | 1/1991 | Cha et al. | 208/407 |
| 5,041,209 | 8/1991 | Cha et al. | 208/251 R |
| 5,720,232 | 2/1998 | Meador | 110/346 |
| 5,756,871 | 5/1998 | Wang | 585/241 |

FOREIGN PATENT DOCUMENTS 9-268293 10/1997 Japan .
10-17871 1/1998 Japan .

*Primary Examiner*—Jacqueline V. Howard
*Assistant Examiner*—Susan Ohorodnik
*Attorney, Agent, or Firm*—McDermott, Will & Emery

[57] ABSTRACT

A thermal decomposition apparatus for decomposing polymer waste is provided which is simple in structure, small in size and inexpensive, and also the operating cost thereof is low.

A feed pipe 18 and an inclined pipe 23 are connected in the form of the letter V at a large angle therebetween, and a feed screw 19 and an feed-up screw 25 are arranged inside the respective pipes. Polymer waste introduced into a hopper 17 is melted in the interior of the feed pipe 18 by heat from a first hot air furnace 10 and accumulated in the V-shaped portion. The polymer melt is then conveyed upward by the feed-up screw 25. In the process of conveyance, the polymer melt undergoes primary decomposition by means of heat from a second hot air furnace 11 and the cracked gas thus generated undergoes secondary decomposition by the heat from a third hot air furnace 12, the resultant gas being guided to a condenser 7. Sludge drops down through a chute pipe 35 into a water tank 36.

6 Claims, 8 Drawing Sheets

THERMAL DECOMPOSITION APPARATUS OF REVERSED TEMPERATURE GRADIENT TYPE FOR POLYMER WASTE

BACKGROUND

1. Field of the Invention

The present invention relates to an apparatus for decomposing waste of plastic products by heat to obtain useful fuel oil or gas.

2. Related Art

There have been proposed a large number of various apparatus for thermally decomposing waste of plastic products, i.e., polymer waste.

Japanese Laid-Open Patent Publication No. 9-268293 entitled "Catalytic Cracking Apparatus for Synthetic Polymers and Oily Material Production Process Using the Apparatus" discloses a technical idea of providing the apparatus with a screw extruder, a tubular pre-heater and a tubular decomposing furnace, feeding polymer waste by the screw extruder and melting it with heat applied thereto, then feeding the polymer melt material to the tubular pre-heater or the tubular decomposing furnace to be further heated so that polymers may be thermally decomposed and gasified, and condensing the resultant gas (decomposed gas) to obtain oily material.

The above publication also describes a structure that the tubular pre-heater and the tubular decomposing furnace are obliquely positioned, screws are arranged in the interiors of the screw extruder, tubular pre-heater and tubular decomposing furnace, to convey waste and a molten material thereof as well as to scrape off and automatically discharge sludge accumulated on the inner walls of the pipes, and the sludge is conveyed to the upper end of the tubular decomposing furnace by the screw therein and is dropped from the elevated position down to the outside of the decomposing furnace.

In addition, the publication describes that the apparatus is capable of continuous operation, and describes a feature that cracked gas generated in the upper portion of the tubular cracker is sealed by the polymer molten material stagnating in the lower portion of the cracker and thus is prevented from flowing back into the tubular pre-heater or the extruder on the upstream side.

However, there is no detailed explanation in the publication as to the structure for directly connecting the tubular cracker and the extruder for introducing raw materials, and concerning this structure, the publication does not disclose measures for preventing an undesirable situation where the gas in the tubular cracker flows back to the extruder side or measures for eliminating a possibility of explosion being caused by air entering the tubular cracker from the extruder. In principle, the disclosed apparatus uses a catalyst such as alumina. The publication describes an embodiment in which no catalyst is used, but in this case, no oily matter is obtained. Further, electric heat is used as a heat source for the tubular preheater and the tubular decomposing furnace. Although electric heat is easy to control and heat management is also easy, electric heat is an uneconomical heat source for this type of apparatus requiring a large quantity of heat.

In Japanese Patent Laid-Open Publication No. 10-17871, there is disclosed "Thermal Decomposition Apparatus for Polymer Waste" comprising a raw material melting tank, an inclined pipe for thermal decomposition and heating means, in which a screw feeder is arranged in the interior of the inclined pipe to convey molten polymer waste as well as to remove sludge, and the heating means is divided into first to third hot air furnaces for thermal decomposition so as to heat the inclined pipe in such a manner that the temperature thereof gradually increases from a lower portion to an upper portion.

This apparatus is capable of continuous operation and uses hot air as a heat source for primary and secondary decompositions, and therefore, a large quantity of heat can be supplied and oil produced by the apparatus itself can be economically used as fuel. However, the apparatus using the inclined pipe for thermal decomposition is constructed such that the inclined pipe extends through chambers (hot air spaces) for primary, secondary and tertiary thermal decompositions, each chamber occupying a large space, and thus an unnecessarily large heating space is required. Accordingly, a considerably large quantity of heat is consumed uselessly, and since the hysteresis of temperature change is large, improvement is still needed as to the difficulty of heat management. Also, the publication does not clearly set forth the relationship between the raw material melting tank and the inclined pipe for thermal decomposition with respect to an inflow of air and a backward flow of gas. Thus, the technical idea disclosed in the publication is not satisfactory in view of reduction in size of the apparatus and reduction in the operating cost.

OBJECT AND SUMMARY OF INVENTION

An object of the present invention is to provide a thermal decomposition apparatus for polymer waste, which is simple in structure, small in size and inexpensive, and also operates in low cost.

A thermal decomposition apparatus comprises first and second chambers. Each "chamber" may take the form of a vessel like a tank having an opening and a bottom, or the form of a pipe which is basically not a vessel. In either case, at least the inner surface of each chamber is made of a wear-resistant, corrosion-resistant material, such as stainless steel, which withstands frictional contact with un-molten polymer waste and is not corroded by molten polymer waste or by a cracked gas produced therefrom.

The first chamber has a receiving section, a fusing section, and a storage section below the fusing section, and the second chamber has a primary decomposing section and a secondary decomposing section above the primary decomposing section. Thus, in the case where each "chamber" is in the form of a pipe, the pipes are inclined to form upper and lower portions. Further, in the case where each "chamber" is in the form of a pipe, it is preferable to provide a screw feeder in each pipe, but this is not essential to the invention.

The fusing section, the storage section, the primary decomposing section and the secondary decomposing section are provided with heating means. Actually, a suitable one of a direct heating structure using electric heat and a hot air circulation structure may be selected depending on the manner the apparatus is used. In view of a heat supply quantity and economy, the hot air circulation structure is preferred. Also, in the case of the hot air type, oil produced by the apparatus can be economically used as fuel. The temperature of the fusing section and the storage section is maintained at 200 to 300° C., the temperature of the primary decomposing section is maintained at 300 to 400° C., and the temperature of the secondary decomposing section is maintained at 400 to 450° C.

The bottom of the storage section of the first chamber and the bottom of the primary decomposing section communicate with each other at a level where polymer molten material is always filled, thereby forming a storage region extending from the first chamber to the second chamber, including the storage section of the first chamber. Namely, the communicating portion is formed at a position where the polymer molten material is always filled so that the outside air may not flow into the primary decomposing section from the first chamber or that the cracked gas may not flow back to the first chamber from the primary decomposing section.

The secondary decomposing section has a lower portion where the polymer molten material stagnates, and an upper portion serving as a cracked gas collecting space. The upper portion of the secondary decomposing section is connected to an oil making device through a pipe so that the cracked gas therein is conducted to the oil making device.

The foregoing is a basic arrangement of the present invention. With this basic arrangement, polymer molten material is always present at the bottom of the first chamber, and accordingly, polymer waste introduced into the first chamber from above comes into contact with the molten material and thus is efficiently melted. Namely, polymer waste receives heat also via a large area of contact with the molten material and the molten material has a larger heat capacity than the air; therefore, the efficiency of heat transfer is high, causing solid polymer waste to be readily melted. Further, even if polymer waste is continuously introduced into the first chamber from above, the state in which the communicating portion is filled with the polymer melt is maintained, thus permitting continuous operation of the apparatus. Consequently, the apparatus has a high capacity to dispose of polymer waste.

Since the thermal decomposition is performed without using a catalyst, the efficiency may be somewhat low, but the apparatus can be made simple in structure and small in size and can be produced at low cost.

The process of decomposing polymer waste in the primary and secondary decomposing sections is known in the technical field.

The apparatus may be constructed in the following way.

The first and second chambers in the form of a vertical tank having an upper opening are arranged side by side and have bottoms thereof connected to each other at a level where polymer melt is filled. For the other parts, the arrangement of this apparatus is identical with the basic arrangement described above, i.e., the first chamber has a receiving section, a fusing section and a storage section below the fusing section, while the second chamber has a primary decomposing section and a secondary decomposing section above the primary decomposing section.

The thermal decomposition apparatus with this arrangement, which is used to decompose polymer waste, can be made most simple in structure and small in size and can be conveniently used in a limited space such as in a vehicle or a ship.

The apparatus may be further provided with means for temporarily shutting off the communication between the bottom of the fusing section of the first chamber and the bottom of the primary decomposing section, and heating means for carbonization capable of maintaining the temperature of the primary decomposing section at 600° C. or higher. The temporary shutoff means includes, in addition to mechanical means such as a shutter or valve movable across the communication path, a cooling device arranged on the same side of the communication path as the first chamber for increasing the viscosity of the polymer molten material in the portion of the communication path closer to the first chamber to such an extent that the polymer molten material temporarily loses its flowability. In either case, after the inflow of the molten material from the first chamber is blocked by the temporary shutoff means, the heating means for carbonization is operated to heat the polymer material (sludge), which has not gasified and thus remains in the second chamber, to 600° C. or higher to carbonize same, so that the carbonized material can be easily scraped off and removed from the second chamber.

In the case where the first and second chambers are formed by tank-like vessels, polymer lumps that are not readily decomposed by heat or metal pieces buried in polymer products during molding are accumulated especially on the bottom of the second chamber in the course of long-term thermal decomposition process. However, since this type of apparatus is not provided with a mechanism for automatically scraping off sludge (including scale), such as a screw feeder, it is necessary that sludge be manually removed at regular intervals to prevent reduction in the thermal decomposition efficiency. In the case of small-sized apparatus, such manual means suffices and the apparatus may be designed with a primary aim of reducing size and cost.

Alternatively, the first chamber may be in the form of a cylinder inclined in such a manner that its rear and front ends are located high and low, respectively, and the second chamber may also be in the form of a cylinder inclined in such a manner that its rear and front ends are located low and high, respectively. The rear end of the first chamber serves as the receiving section, while the front end of same is connected to the rear end of the second chamber such that the interiors of the two chambers communicate with each other. The first chamber has a screw feeder therein which is driven by a motor and extends along the chamber, and the front half of the first chamber serves as the fusing section and the storage section. Rear and front halves of the second chamber respectively serve as the primary decomposing section and the secondary decomposing section, and the second chamber is connected at front end to a gas collecting space.

Thus, the cylinder constituting the first chamber and the cylinder constituting the second chamber meet in the form of the letter V with a large angle therebetween in such a manner that the first and second chambers adjoin, and a specified region including the vertex at the lowest level serves as the storage section in which polymer melt is filled. The second chamber is also connected at front end to a sludge chute pipe extending downward. For the other parts, the arrangement of this apparatus is similar to the basic arrangement stated above.

In this apparatus, each of the first and second chambers is constituted by a cylindrical member having a screw feeder arranged therein and thus the structure is somewhat complicated. However, the apparatus has a high thermal decomposition capacity, in addition to the aforementioned advantages achieved by the basic arrangement, because the polymer molten material is thermally decomposed while being conveyed. Also, sludge, which is liable to be accumulated in the interior of the second chamber, can be automatically removed by the screw feeder.

In this apparatus, the storage section of the first chamber and the second chamber, both in cylindrical form, may be surrounded by an outer cover to form heating spaces around the first and second chambers. Hot air is introduced into the heating spaces from hot air furnaces to heat the interiors of the first and second chambers to predetermined temperatures. Specifically, hot air from a fusing hot air furnace is circulated in the heating space corresponding to the fusing section of the first chamber, hot air from a primary hot air furnace is circulated in the space associated with the storage section of the first chamber and the primary decomposing section of the second chamber, and hot air from a secondary hot air furnace is circulated in the heating space corresponding to the secondary decomposing section of the second chamber.

With this arrangement, since the first and second chambers both in cylindrical form are surrounded by the outer cover to define the heating spaces, the heating spaces can be located immediately close to the regions requiring heating. Also, the heating spaces are small in volume and thus it is possible to make full use of the hot air, permitting efficient heating. Consequently, the apparatus can be reduced in size and cost. In the hot air furnace for supplying hot air of relatively low temperature such as the fusing hot air furnace, a heat exchanger may be arranged at a suitable position along a hot air circulation path to make use of preheating by the primary or secondary hot air furnace. Further, the circulation paths of the hot air furnaces may be partly connected to one another for the purpose of temperature adjustment or preheating.

Either of the above two apparatus may be constructed such that a third decomposing section is provided at a level higher than the secondary decomposing section, that the temperature of the space in the tertiary decomposing section is maintained at about 500° C., and that the cracked gas is guided from the third decomposing section to the oil making device. With this arrangement, the cracked gas which has undergone the secondary decomposition but has a large molecular weight can be further decomposed, making it possible to obtain a large amount of light oil with a small molecular weight. If the third decomposition is advanced to a high degree, then the cracked gas becomes too small in molecular weight to be liquefied, in which case the gas, if usable, may be conducted to the outside of the apparatus as it is.

EMBODIMENT

Figure 1:
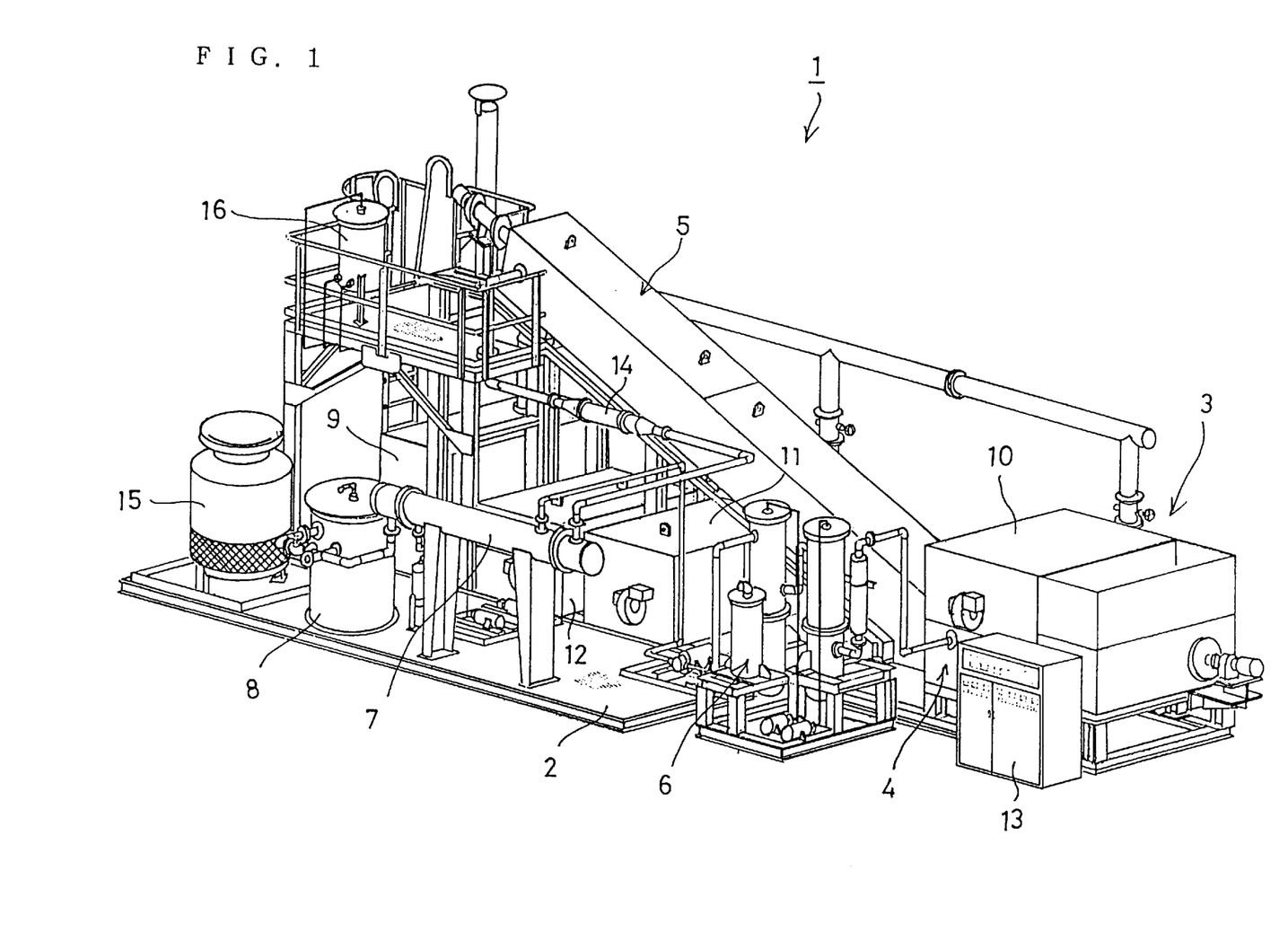
FIG. 1 is a perspective view showing an entire thermal decomposition apparatus 1 (first embodiment)
Figure 2:
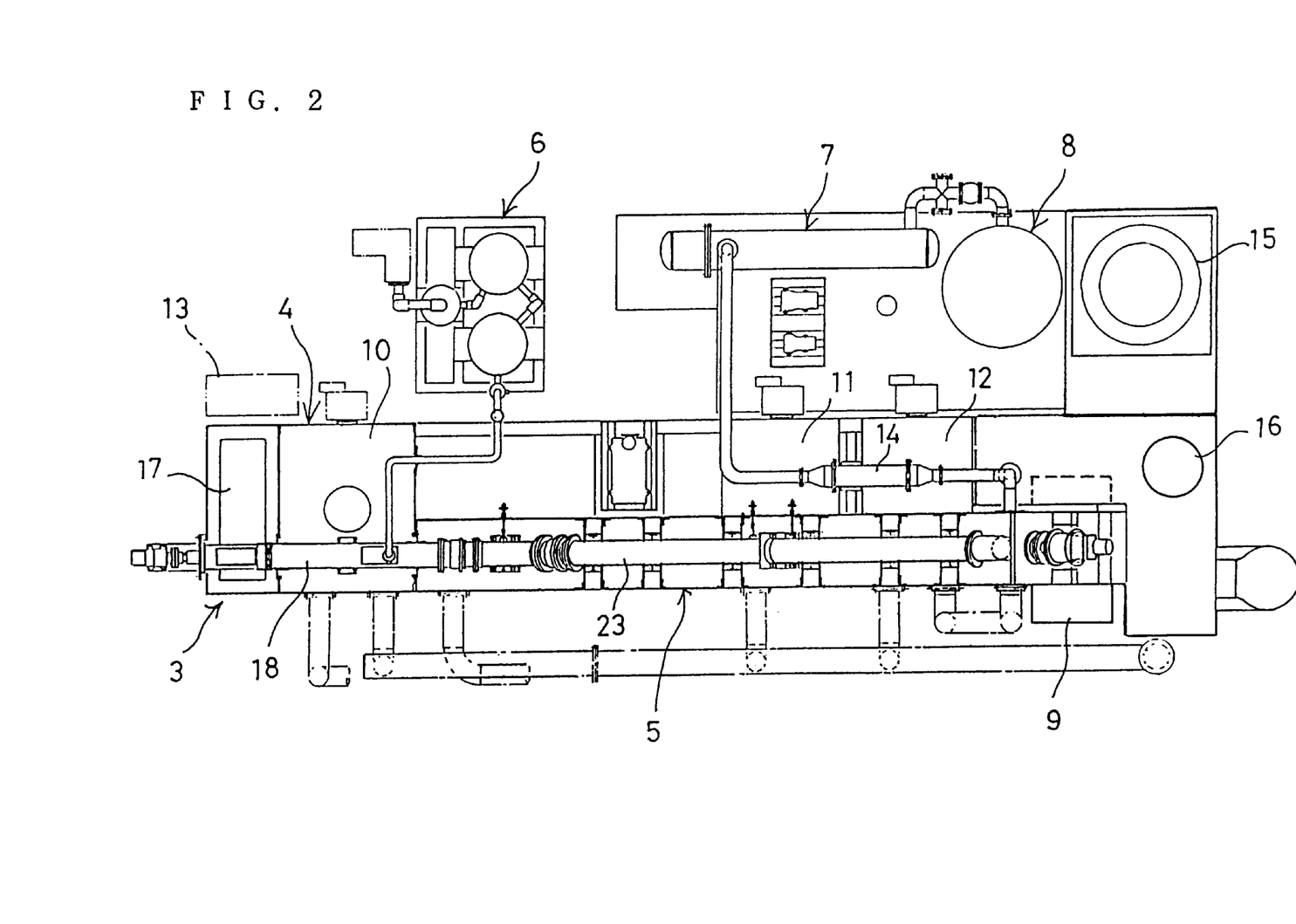
FIG. 2 is a plan view showing the entire thermal decomposition apparatus (with part thereof cut away)

FIGS. 1 and 2 both illustrate an entire thermal decomposition apparatus according to a first embodiment, and FIG. 2 shows an internal arrangement of the apparatus with part of an introducing device and a decomposing device, which are described later, cut away. A thermal decomposition apparatus 1 comprises an introducing device 3, a fusing device 4, an inclined decomposition device 5, a dechlorinating device 6, a condenser 7, an oil storage tank 8, a sludge box 9, and first to third hot air generating furnace 10, 11 and 12 all set up on a base 2. Reference numeral 13 denotes a controller of ordinary type including an input/output section, a memory section, and an arithmetic processing section. The memory section stores therein programs for a thermal decomposition procedure, and the input section receives signals from various sensors arranged at respective suitable positions of the thermal decomposition apparatus 1. Reference numeral 14 denotes an accumulator connected to a pipe extending to the condenser 7, 15 denotes a cooling tower used for cooling the condenser 7, and 16 denotes a service tank storing fuel to be supplied to burners of the first to third hot air generating furnaces 10 to 12.

Figure 3:
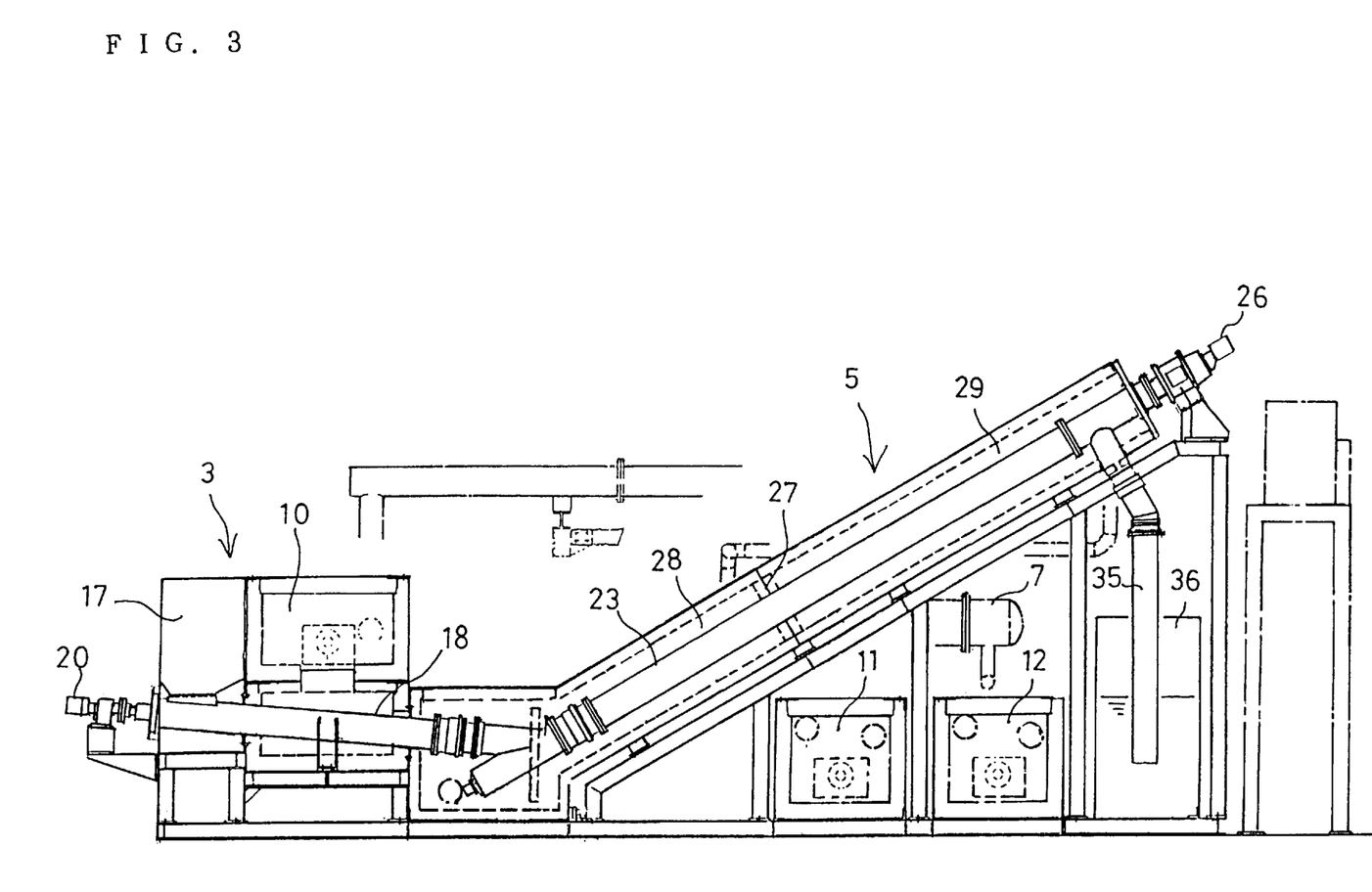
FIG. 3 is a front view schematically showing the entire thermal decomposition apparatus (with part thereof cut away)
Figure 4:
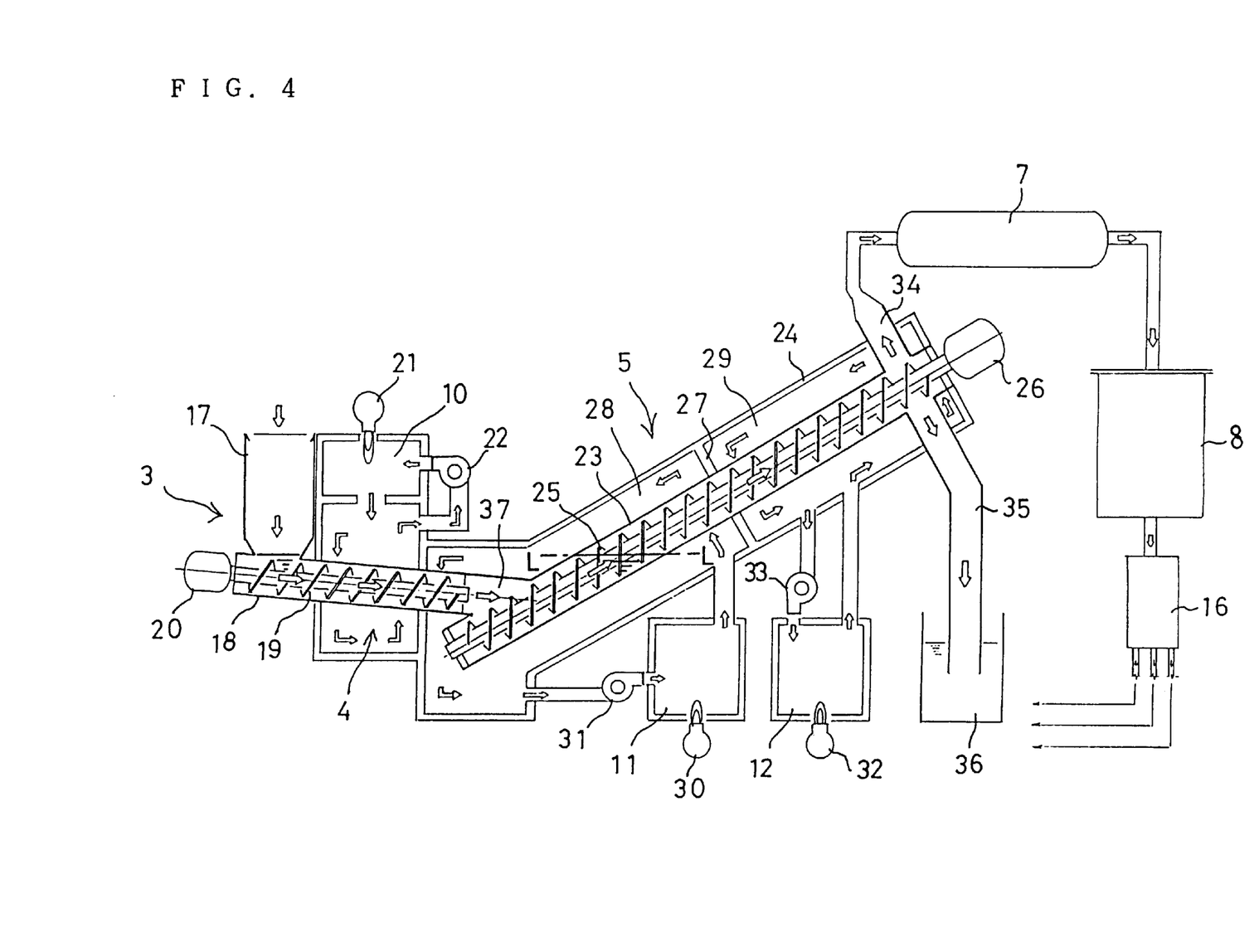
FIG. 4 is a flow diagram illustrating the operation.
Figure 5:
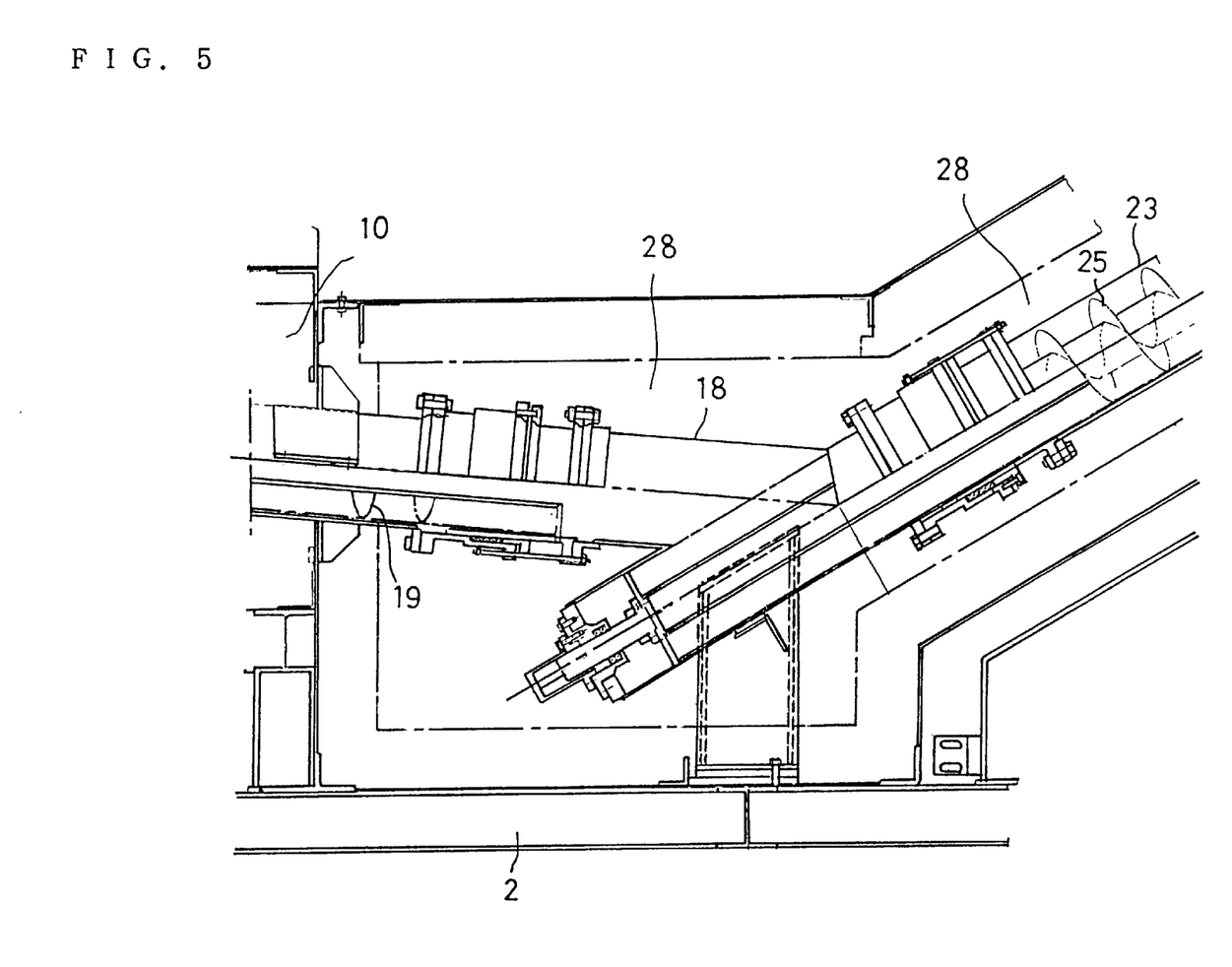
FIG. 5 is a view (partly in section) showing the relationship between a storage region and a lower heating space.

As shown in FIGS. 2 and 3, the introducing device 3 comprises a hopper 17 and a feed pipe 18. The feed pipe 18 has a feed screw 19 (FIG. 4) arranged therein and an intermediate portion thereof passes through the first hot air furnace 10. The feed pipe 18 is a stainless steel pipe having a length of about 3300 mm and a diameter of 250 mm, and the feed screw 19 is also made of stainless steel and has a screw pitch of 150 mm. The feed screw 19 is rotated at 4 rpm by a first motor 20 arranged at the rear end of the feed pipe. In FIG. 4, reference numeral 21 denotes a burner, and 22 denotes a blower for circulating hot air. The operations of the first motor 20, the burner 21 and the blower 22 are under the control of the controller 13. The structure of the feed pipe 18 having the feed screw 19 therein and passing through the first hot air furnace 10 constitutes the fusing device 4. The first hot air furnace 10 is controlled so that the temperature of the interior of a part of the feed pipe passing through the furnace 10 is maintained in a range from 200 to 300° C. with 250° C. as a mean.

Figure 6:
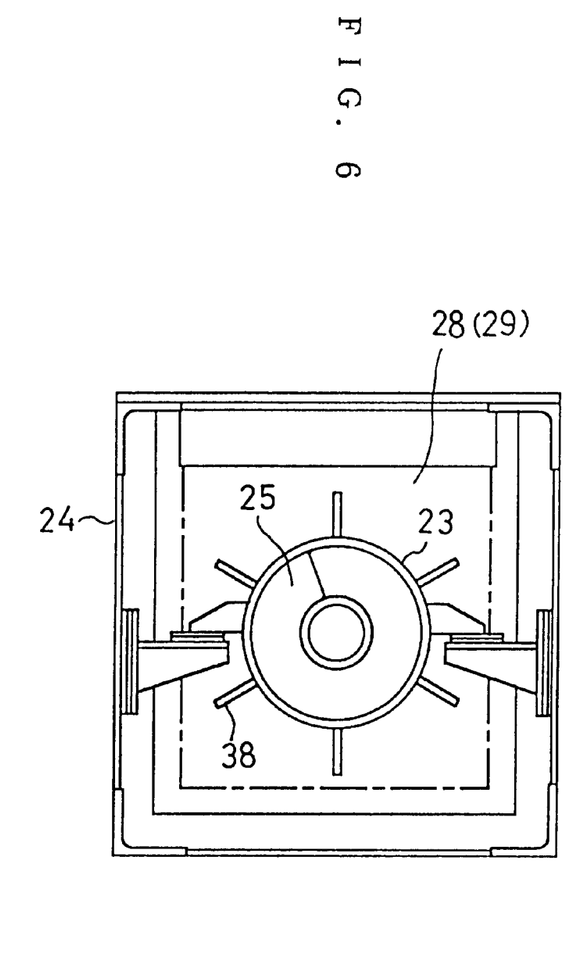
FIG. 6 is a sectional view showing the manner of mounting heat receiving fins.
Figure 7:
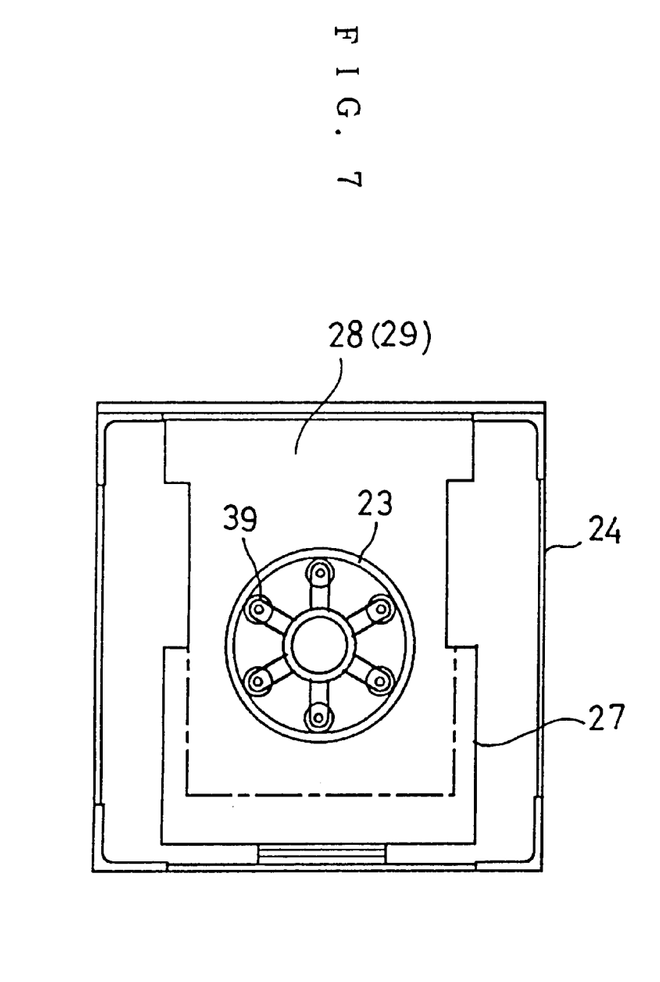
FIG. 7 is a sectional view showing the manner of mounting deflection preventing rollers.

The decomposition device 5 is constituted by an inclined pipe 23 inclined at an angle of about 30 degrees with rear and front ends thereof located low and high, respectively, and an outer tube 24 surrounding the outer periphery of the inclined pipe 23. An feed-up screw 25 is arranged inside the inclined pipe 23 so as to extend therethrough. The inclined pipe 23 is a stainless steel pipe having a length of about 7000 mm and a diameter of 250 mm, and has six heat receiving fins 38 (FIG. 6) formed on the outer surface thereof along the longitudinal direction and spaced from one another in the circumferential direction. The feed-up screw 25 extending through the inclined pipe 23 is also made of stainless steel, has a shaft of 100 mm in diameter with a screw formed thereon at a pitch of 150 mm, and is rotated at 4 rpm by a second motor 26 mounted to the front end of the inclined pipe 23. The feed-up screw 25 is also provided with six supporting rollers 39 (FIG. 7) arranged separately from one another in both the longitudinal and circumferential directions of the shaft so that the feed-up screw 25 is prevented from deflection due to its own weight.

A space between the inclined pipe 23 and the outer tube 24 serves as a heating space which is divided by a separation wall 27 into a lower space 28 and an upper space 29. A second hot air furnace 11 is connected to the lower space 28 and heat generated by a burner 30 is circulated through the lower space by a blower 31. A third hot air furnace 12 is connected to the upper space 29 and heat generated by a burner 32 is circulated through the upper space by a blower 33. The outer tube 24 defining the lower and upper spaces 28 and 29 has an inner surface covered with a heat insulating material.

The upper end portion of the inclined pipe 23 expands upward to form a gas collecting space 34, which is connected to the condenser 7 (FIG. 4). The upper end portion of the inclined pipe 23 also has a lower opening which is connected to a sludge chute pipe 35. The sludge chute pipe 35 has a lower end opening into water in a water tank 36, thus forming a water sealed structure.

The operations of the feed-up screw 25, the second motor 26, the burners 30 and 32, and the blowers 31 and 33 are under the control of the controller 13. The second hot air furnace 11 is controlled to maintain the temperature of the lower space 28 at 300 to 400° C. so that lower and upper portions of the lower space 28 are approximately at 350° C. and 400° C., respectively. A storage region at the lower end portion of the feed pipe is situated in the lower space 28 and is heated to almost the same degree as the lower end portion of the inclined pipe 23, that is, about 350° C. The third hot air furnace 12 is controlled in such a manner that the temperature of the upper space 29 is maintained at 400 to 500° C. with 450° C. as a mean.

The feed pipe 18, which is inclined at an angle of about 5 degrees with its rear end located slightly higher than its front end, is connected at the front end to a lower portion of the inclined pipe 23 such that the interior thereof communicates with that of the pipe inclined 23. Namely, the feed pipe 18 and the inclined pipe 23 are connected to each other in the form of the letter V with a large angle therebetween and the joining portion is positioned at the lowest level.

The dechlorinating device 6, which is connected via a pipe to the feed pipe 18 of the fusing device 4 (FIG. 2), comprises a conventionally known device for sucking in gas inside the feed pipe 18 to the interior thereof and ejecting water to the gas to allow chlorine contained in the gas to be dissolved in water so that the resultant hydrochloric acid is collected. The condenser 7 is connected to the gas collecting space 34 of the decomposing device 5 by a pipe through the accumulator 14, and the high-temperature gas is cooled to be liquefied (to make oil) by condensing the gas molecules in cooperation with the function of the cooling tower 15. The gas may be cooled to different degree by stages so that various kinds of oil can be collected separately.

Polymer waste (such as waste of plastic products including polyethylene, polypropylene, polystyrene, ABS resin, vinyl chloride, polyethylene terephthalate, etc.; kinds of plastics are not particularly limited) is introduced into the hopper 17, and as the waste is pressed from above due to its own weight or with the use of a pressing mechanism, it is fed forward by the feed screw 19. Waste of small size may be introduced directly, but waste of large size should preferably be crushed or cut beforehand. While passing through the feed pipe 18, the waste is heated and melted at the portion of the feed pipe 18 which extends through the first hot air furnace 10. The polymer melt thus obtained is fed forward and accumulated at the V-shaped joint of the feed pipe 18 and the inclined pipe 23.

Namely, the feed pipe 18 constitutes a first chamber of a polymer waste treatment space which extends from the rear end of the feed pipe 18 to the front end of the inclined pipe 23, and a rear end portion, an intermediate portion and a front end portion of the first chamber serve as an inlet section communicating with the hopper, a fusing section subjected to heat from the first hot air furnace 10, and a storage section where the polymer melt is accumulated, respectively.

Chlorine gas generated in the fusing section during the process of decomposing vinyl chloride etc. is removed by the dechlorinating device 6.

With this arrangement of the first chamber, even waste which has a high melting point and thus is not readily melted can be completely melted in short time upon contact with the accumulated molten material, due to high heat capacity of and large area of contact with the molten material.

The quantity of polymer molten material accumulated in the V-shaped joint increases up to a level (line L in FIG. 4) corresponding to the bottom of the hopper 17, to form a storage region 37 including the rear end of the inclined pipe 23 at this level. Consequently, the communicating portion where the feed screw 19 and the inclined pipe 23 are jointed is always filled with the polymer molten material. Thus, the interior of the inclined pipe 23 is substantially blocked off from the outside air, and this prevents the outside air from entering the interior of the inclined pipe 23 and also prevents the cracked gas inside the inclined pipe 23 from being ejected to the outside from the hopper.

The feed-up screw 25 rotates inside the inclined pipe 23 and forces the polymer molten material in the storage region 37 upward while stirring same. Accordingly, the polymer molten material is heated up to about 400° C. in the interior (primary decomposing section) of the portion of the inclined pipe 23 corresponding to the lower space 28, so that polymer chains are destroyed, producing cracked gas. The cracked gas gathers in the interior (secondary decomposing section) of the portion of the inclined pipe corresponding to the upper heating space 29 and is further heated up to about 450 to 500° C., so that the cracked gas turns into cracked gas with a smaller molecular weight.

Since the upper part of the secondary decomposing section forms the gas collecting space 34, the cracked gas which has thus been reduced in molecular weight and thus made light gathers in this space and is then introduced into the condenser 7 to be turned into oil. The gas collecting space 34 may be designed to serve as a tertiary decomposing section so that the cracked gas may be further heated (up to about 500° C.); in this case, however, if the heating temperature is too high, the molecular weight of the cracked gas becomes so small that the gas can not be changed into oil by ordinary cooling means, and therefore, care must be given to the kind of polymer waste.

Non-melting members such as metal parts that were buried in polymer waste and could not be removed in advance form sludge and deposit in the melt, but the feed-up screw 25 rakes the sludge and conveys same upward so that the sludge may drop into the sludge chute pipe 35 from the opening in the front end of the inclined pipe 23. The lower end of the sludge chute pipe 35 opens into water, and this prevents the interior of the inclined pipe 23 from being connected to the outside air and also contributes to adjustment of the pressure within the inclined pipe 23.

One ton of crushed polyethylene waste was actually introduced continuously from the hopper, and approximately 1000 liters of oil usable as fuel could be obtained. The apparatus of this embodiment has a disposal capacity of about 1 ton/2 hours.

In the tube type apparatus of this embodiment, the fusing section, the primary decomposing section and the secondary decomposing section occupy a small space and thus are compact (the space contains the pipe of 250 mm in diameter in which is passed the feed-up screw 25 having the shaft of about 100 mm in diameter), thus making it easy for heat to transfer throughout the entire cross section, and since the polymer melt is caused to flow by the feed-up screw 25 and the temperature gradually increases from the lower toward the upper portion, heat is distributed uniformly throughout the cross section, whereby the quantity of heat supplied can be utilized efficiently and it is also possible to eliminate the situation where excessive heat is applied in order to raise the temperature of the intermediate portion up to temperatures necessary for the primary and secondary decompositions, which may cause the polymer melt to be carbonized upon contact with the inner surface of the inclined pipe 23.

Figure 8:
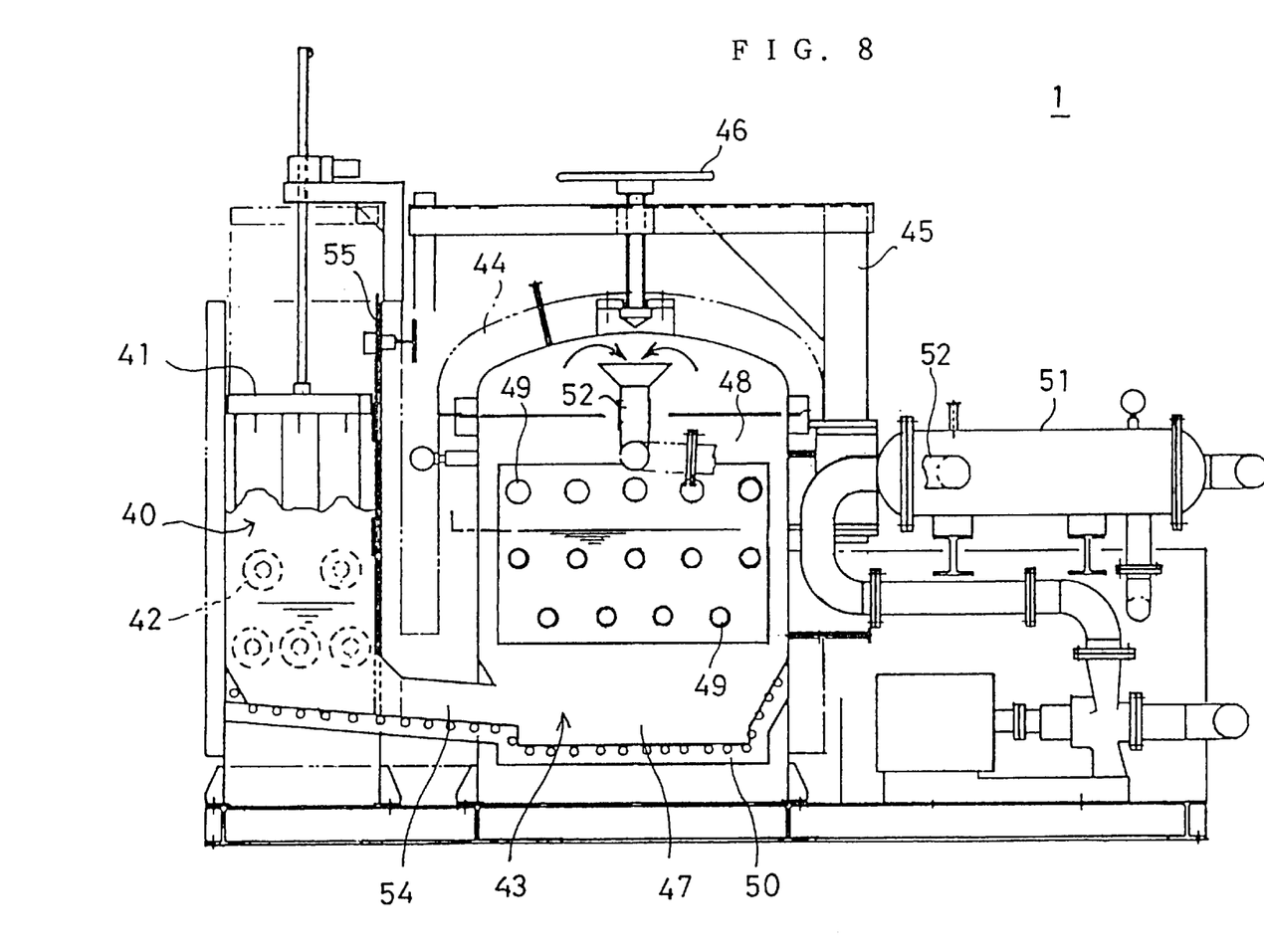
FIG. 8 is a front view (partly in section) showing an entire thermal decomposition apparatus (second embodiment)
Figure 9:
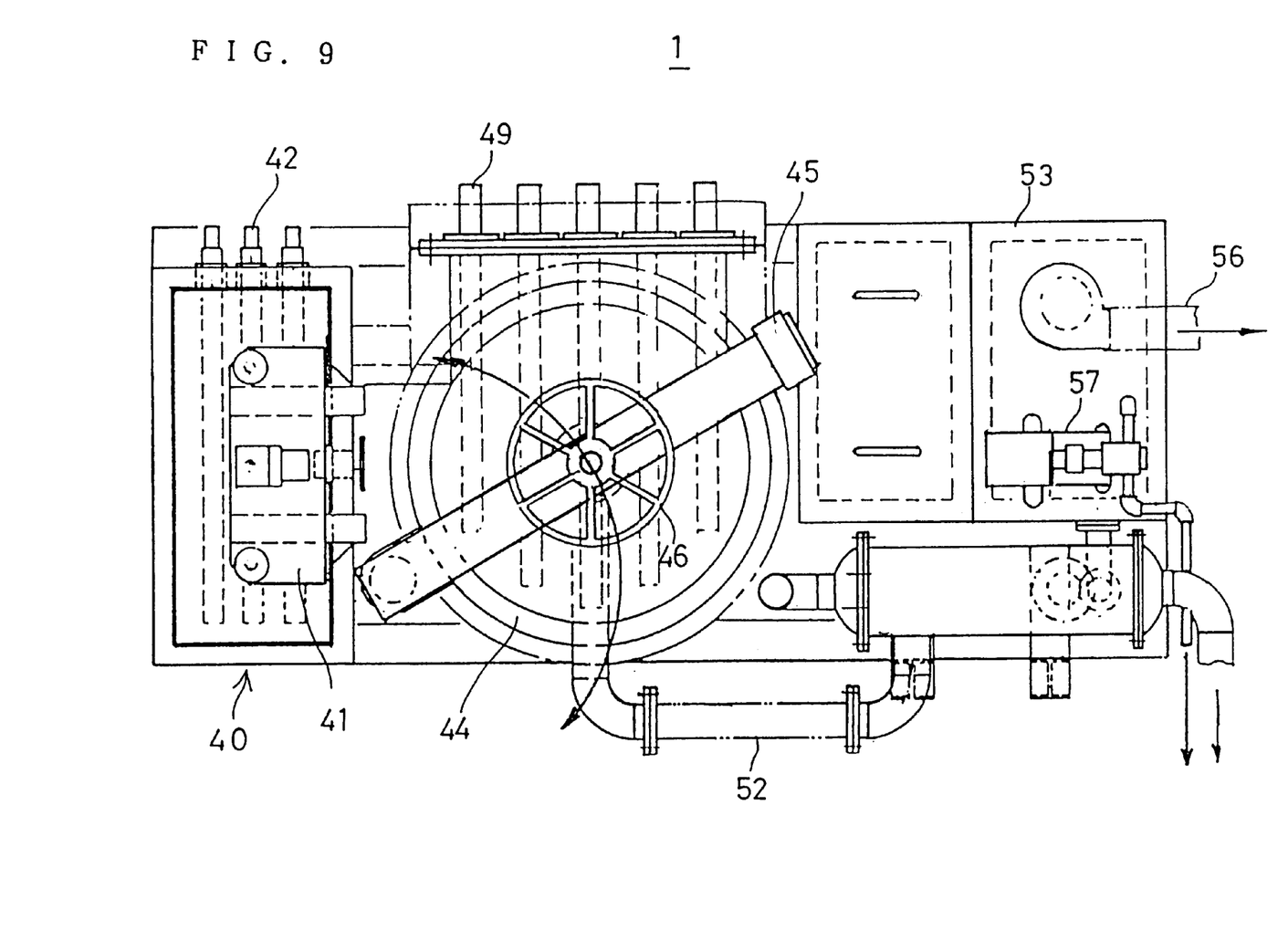
FIG. 9 is a plan view showing the entire thermal decomposition apparatus.

FIGS. 8 and 9 show an entire thermal decomposition apparatus according to a second embodiment. The first embodiment has a structure wherein the first and second chambers are constituted respectively by the tubular feed pipe 18 and the tubular inclined pipe 23 both having a cylindrical shape, and polymer waste and a melt thereof are conveyed by the screws inside the pipes and melted and gasified while being conveyed; in the second embodiment, the first and second chambers are each in the form of a tank having a bottom and an upper opening. In order to make the thermal decomposition apparatus as simple in structure as possible, the second embodiment does not have the dechlorinating device or the hot air furnaces, and the control device used has only minimum functions such as the function of raising necessary alarms.

In FIGS. 8 and 9, reference numeral 40 denotes a first chamber which comprises a tank having a rectangular cross-sectional form. The first chamber also serves as a hopper and has a vertically movable pressure member 41 therein. A plurality of electrically heating bars 42 are inserted through a side wall of the first chamber into the interior thereof at locations such that the density of the heating bars is higher in the lower portion of the tank. The electric heating bars 42 used have predetermined calorific power such that the temperature of the lower region of the first chamber 40 can be maintained approximately at 250° C. The pressure member 40 exerts a pushing force by its own weight, but such pushing effect may be achieved with the use of springs.

Reference numeral 43 denotes a second chamber which comprises a tank having a circular cross-sectional form and having an upper opening closed with a cover 44 supported by a horizontal arm. The horizontal arm is swingable about one end thereof. The cover 44 is closed during thermal decomposition process, and can be opened and closed by means of a handle 46 located between the one end of the arm and a frame 45. The interior of the second chamber is divided according to design into a primary decomposing section 47 (below line L in FIG. 8) in which a polymer melt stagnates and a secondary decomposing section 48 situated above the section 47, and a plurality of electrically heating bars 49 are inserted into the two decomposing sections. Also, an ignition heater 50 is embedded in the bottom of the second chamber. One end of a pipe 52 communicating with a condenser 51 opens into the space of the secondary decomposing section 48 and serves as a suction port for cracked gas.

Oil obtained through condensation and liquefaction by the condenser 51 is stored in an oil storage tank 53. Those electrically heating bars 49 located in the primary decomposing section 47 have predetermined calorific power such that the temperature of this section 47 can be kept at about 350° C., while those electric heating rods 49 located in the secondary decomposing section 48 have predetermined calorific power such that the temperature of the section 48 can be kept at about 450° C.

The lower portions of the first and second chambers 40 and 43 are connected to each other by a communication path 54 which slightly slopes down to the second chamber 43, and a shutter 55, which can be vertically moved from outside for closing the communication passage 54, is arranged at the connecting portion. The shutter 55 is made of a flat iron plate and is pulled up during the thermal decomposition process, thereby opening the communication passage 54. The first and second chambers 40 and 43 have their inner surfaces made of stainless steel and outsides thereof are covered with a heat insulating material.

In FIG. 9, reference numeral 56 denotes a combustible gas conducting pipe for conducting gas which has not been liquefied to the outside, so that the gas can be used as fuel. Reference numeral 57 denotes a pump for drawing oil from the oil storage tank 53 and supplying the oil to other parts. This apparatus is designed for use in a ship etc. for disposing of polymer waste discarded during a long-term voyage, for example, and is small in size. In this embodiment, the first chamber has a height of about 1200 mm, a depth of 1000 mm and a width of about 500 mm, and the second chamber has a height of about 800 mm and a diameter of 800 mm.

Polymer waste is introduced into the first chamber 40 from above, then pressed down by the pressure member 41, and is melted at about 250° C. with heat applied thereto from the electrically heating bars 42 arranged at the lower portion of the chamber. The polymer melt thus obtained is accumulated in the lower portion of the first chamber 40. Thus, the first chamber is constituted by an upper inlet section and lower melting and storage sections. This embodiment has no dechlorinating device, and therefore, in cases where the waste has a large content of vinyl chloride etc. mixed therein, calcium hydroxide is put in the chamber together with the polymer waste for dechlorination. In this case, chlorine can be collected in the form calcium chloride together with sludge.

Where polymer waste is continuously introduced into the first chamber, a melt thereof enters the second chamber through the communication passage 54 and is accumulated up to a level indicated by the line L. The polymer molten material in the primary decomposing section 47 is heated at 350° C. by the electrically heating bars 49, and polymer chains are broken to produce a cracked gas which then gathers in the upper secondary decomposing section 48. In the secondary decomposing section 48, the cracked gas is heated up to about 450° C. by the electrically heating bars 49, to thereby further reduce the molecular weight of the cracked gas. The cracked gas is conducted by the pipe 52 into the condenser 51 to be turned into oil, which is then collected as fuel. The apparatus of this embodiment can produce about 900 liters of oil from 1 ton of polymer waste and has a disposal capacity of 100 kg/1 hour.

During the decomposition process, the polymer melt stagnates in the first and second chambers 40 and 43, forming a storage region including the communication path 54, and thus the communication path 54 is always filled with the melt. This serves to eliminate dangerous situations where the outside air enters the second chamber 43 through the first chamber 40 or the cracked gas in the second chamber 43 is ejected to the first chamber 40.

As the thermal decomposition process is continued, metals buried in the polymer waste or polymers that are not readily decomposed deposit on the bottom of the first chamber 40 in the melting step, then pass through the sloping communication path 54 and are accumulated on the bottom of the second chamber 43. Accordingly, after every 10 hours of thermal decomposition process, for example, the shutter 55 is operated to close the communication passage 54, then electric current is supplied to the ignition heater 50 at the bottom of the second chamber to keep the bottom temperature at 600° C. or higher, thereby carbonizing the remaining material, and the cover 44 at top of the second chamber 43 is opened so that the carbonized sludge inside the chamber may be scraped away.

Namely, the ignition heater 50 serves as a heating means for carbonization. Alternatively, a tray may be arranged in advance at the bottom of the second chamber 43 so that the remaining material may be carbonized thereon, and the tray with the carbonized sludge thereon may be pulled up to the outside of the second chamber 43. It is to be noted that the shutter 55 is not an indispensable element. Also, when the thermal decomposition process is restarted after interruption, the ignition heater 50 may be used as a heat source for softening the waste that has solidified due to the interruption of the process. In this case, the ignition heater 50 is arranged also at the bottom of the first chamber 40.

The two embodiments of the present invention described above may be modified in various ways according to the required scale of the apparatus, the environment in which the apparatus is installed, the kind of polymer waste to be treated, etc.

With the arrangement as recited in claim 1, the principal part of the thermal decomposition apparatus is basically constituted by first and second chambers connected to each other by a communication passage, wherein the first chamber forms an inlet section, a fusing section and a storage section, the second chamber forms primary and secondary decomposing sections, and the communication passage connecting the first and second chambers is always filled with polymer melt. It is therefore possible to eliminate dangerous situations where the outside air flows into the decomposition chamber or the cracked gas within the decomposition chamber flows back to the inlet section side, without the need for a special shutoff device, whereby the apparatus can be simplified in structure, making it possible to provide an apparatus reduced in size at low cost.

Consequently, a small-sized apparatus can be provided at low cost.

With the arrangement as recited in claim 2, the first and second chambers are each in the form of a tank. Since no special conveyor device is provided for polymer waste or a melt thereof, the size of the thermal decomposition apparatus can be further reduced, permitting the apparatus to be installed in a ship or a vehicle.

With the arrangement as recited in claim 3, sludge in the second chamber can be carbonized with the communication passage temporarily shut off, and thus sludge can be easily disposed of even by hand.

With the arrangement as recited in claim 4, the first and second chambers are cylindrical in shape, communicate with each other and have a conveyor device therein, whereby the process of thermally decomposing polymer waste can be continuously carried out with high efficiency. A series of primary and secondary decompositions is continuously performed in the interior of a single inclined pipe, whereby the decomposition apparatus can be simplified in structure. The apparatus is capable of automatically conveying polymer waste and a molten material thereof by the screw feeder and thus is highly mechanized, and yet it can be reduced in overall size and cost. Also, a series of stages from the inlet section to the secondary decomposing section is implemented by a single pipe structure bent in the form of the letter V and polymer melt is made to stagnate in the bent portion of the pipe; therefore, it is possible to prevent entry of the outside air and backward flow of the cracked gas without the need to use a special device.

With the arrangement as recited in claim 5, the heating space for heating the storage section of the first chamber and the second chamber can be reduced in size. Thus, since the quantity of heat supplied can be utilized efficiently, the operating cost of the thermal decomposition apparatus can be cut down. Further, polymer melt is never carbonized by excessive heat upon contact with the inner surface of the second chamber, thus permitting efficient thermal decomposition process.

With the arrangement as recited in claim 6, the molecular weight of the cracked gas is reduced by additional heating, and this makes it possible to obtain a larger amount of oil usable as light fuel.

What is claimed is:

1. A thermal decomposition apparatus for polymer waste comprising:

a first chamber including a receiving section, a fusing sections and a storage section below said fusing section;

a second chamber including a primary decomposing section and a secondary decomposing section above said primary decomposing section;

a storage region formed at an intersection of said storage section and said primary decomposing section:

a first heater for maintaining a temperature of said fusing section between approximately 200° C. and 300° C.;

a second heater for maintaining a temperature of said primary decomposing section and said storage region between approximately 300° C. and 400° C.;

a third heater for maintaining a temperature of said secondary decomposing section between approximately 400° C. and 500° C.;

wherein an upper portion of said secondary decomposing section includes a collecting space communicating with an oil-liquefying device to liquify decomposed gas input from the collecting space.

2. A thermal decomposition apparatus for polymer waste according claim 1, further comprising:

a third decomposing section over said secondary decomposing section; and a fourth heater for maintaining a temperature of said third decomposing section at about 500° C.;

wherein said collecting space is disposed within said third decomposing section and said collecting space communicates with an oil-liquefying device.

3. A thermal decomposition apparatus for polymer waste comprising:

a substantially vertical first chamber having an opening at an upper portion thereof and including a receiving section, a fusing section, and a storage section below said fusing section;

a second chamber adjacent said first chamber, said second chamber having an opening covered by a lid and including a primary decomposing section and a secondary decomposing section above said primary decomposing section;

a downwardly sloping communication passage joining a bottom of said storage section to a bottom of said primary decomposing section;

a storage region comprising a bottom of said storage section, said communication passage and a bottom of said primary decomposing section;

a first heater for maintaining a temperature of said fusing section between approximately 200 and 300° C.;

a second heater for maintaining a temperature of said primary decomposing section and said storage region between approximately 300 and 400° C.;

a third heater for maintaining a temperature of said second decomposing section between approximately 400 and 500° C.;

wherein an upper portion of said secondary decomposing section includes a collecting space communicating with an oil-liquefying device to liquify decomposed gas input from the collecting space.

4. A thermal decomposition apparatus for polymer waste according to claim 3, further comprising:

isolation means for isolating the bottom portion of said storage section of said first chamber from the bottom portion of said primary decomposing section of said second chamber, and an ignition heater adjacent a bottom portion of said primary decomposing section for maintaining a temperature of said primary decomposing section above approximately 600° C.

5. A thermal decomposition apparatus for polymer waste comprising:

a first chamber with a substantially cylindrical shape having a receiving end higher than a both of a fusing section and a storage section;

a second chamber with a substantially cylindrical shape having a primary decomposing section lower than a secondary decomposing section including a gas collecting space and a sludge tube;

a storage region formed at an intersection of said storage section and said primary decomposing section;

a screw feeder disposed within said second chamber driven by a motor external to said second chamber;

a first heater for maintaining a temperature of said fusing section between approximately 200 and 300° C.;

a second heater for maintaining a temperature of said primary decomposing section and said storage region between approximately 300 and 400° C.; and a third heater for maintaining a temperature of said secondary decomposing section between approximately 400 and 500° C.;

wherein said secondary decomposing section includes a gas collecting space connected to an oil-liquefying device.

6. A thermal decomposition apparatus for polymer waste according to claim 5, further comprising:

an outer enclosure enclosing at least one of said storage section, said primary decomposing section and said secondary decomposing section defining heating spaces between said outer enclosure and the respective sections;

wherein said first heater said second heater, and said third heater output heated air to said heating spaces to maintain said fusing section, said primary decomposing section, and said secondary decomposing section within predetermined temperate ranges.

* * * * *